US005376149A

United States Patent [19]

Defieuw et al.

[11] Patent Number: 5,376,149

[45] Date of Patent: Dec. 27, 1994

[54] DYE-RECEIVING ELEMENT FOR THERMAL DYE SUBLIMATION

[75] Inventors: Geert Defieuw, Kessel-Lo; Luc Van Steen, Antwerp; Eric Mostaert, Boechout; August Mariën, Westerlo, all of Belgium

[73] Assignee: Agfa-Gevaert, N.V., Mortsel, Belgium

[21] Appl. No.: 59,281

[22] Filed: May 11, 1993

[30] Foreign Application Priority Data

Jun. 4, 1992 [EP] European Pat. Off. .......... 92201620

[51] Int. Cl.$^5$ .......... B32B 27/08

[52] U.S. Cl. .......... 8/471; 428/480; 428/483; 428/913; 428/914; 503/227

[58] Field of Search .......... 8/467, 471; 503/227; 428/480, 913, 914, 483

[56] References Cited

U.S. PATENT DOCUMENTS

| | | | |
|---|---|---|---|
| 4,713,365 | 12/1987 | Harrison | 8/471 |
| 4,748,150 | 5/1988 | Vanier et al. | 8/471 |
| 4,990,486 | 2/1991 | Kamosaki et al. | 8/471 |
| 4,992,414 | 2/1991 | Kishida et al. | 8/471 |
| 5,034,371 | 7/1991 | Tanaka et al. | 503/227 |
| 5,055,444 | 10/1991 | Kaszczuk | 8/471 |
| 5,096,877 | 3/1992 | Kushi et al. | 8/471 |
| 5,198,408 | 5/1993 | Martin | 8/471 |
| 5,244,234 | 9/1993 | Oshima et al. | 8/471 |

*Primary Examiner*—Paul Lieberman
*Assistant Examiner*—Caroline L. Dusheck
*Attorney, Agent, or Firm*—Breiner & Breiner

[57] ABSTRACT

Dye-receiving element for thermal dye sublimation transfer comprising a support having on one side a dye-receiving layer and, optionally on the other side a back-coat layer, the support carrying on at least one side a subbing layer comprising a copolyester formed by poly-condensation of at least one aromatic dicarboxylic acid and at least one aliphatic diol, wherein the copolyester further comprises at least one comohomer having at least one sulfonate group in the acid form, alkalimetal salt form, and mixtures thereof.

12 Claims, No Drawings

DYE-RECEIVING ELEMENT FOR THERMAL DYE SUBLIMATION

1. Field of the Invention

The present invention relates to dye-image receiving elements for use in thermal dye sublimation transfer methods, and in particular to subbing layers improving the adhesion between the support and the dye-receiving layer and/or between the support and the backcoat layer of the dye-image receiving element.

2. Background of the invention

Thermal dye sublimation transfer also called thermal dye diffusion transfer is a recording method in which a dye-donor element provided with a dye layer containing sublimable dyes having heat transferability is brought into contact with a receiver sheet and selectively, in accordance with a pattern information signal, heated with a thermal printing head provided with a plurality of juxtaposed heat-generating resisters so as to transfer dye from the selectively heated regions of the dye-donor element to the receiver sheet, thus forming a pattern thereon, the shape and density of which is in accordance with the pattern and intensity of heat applied to the dye-donor element.

A dye-donor element for use according to thermal dye sublimation transfer usually comprises a very thin support e.g. a polyester support, one side of which is covered with a dye layer that contains the printing eyes. Usually an adhesive or subbing layer is provided between the support and the dye layer. To avoid sticking to the thermal printing head and to facilitate passage of the dye-donor element under the thermal printing head the rear side of the support (side opposite to that of the dye layer) may typically be provided with a heat-resistant layer. An adhesive or subbing layer is usually provided between the support and the heat-resistant layer.

A dye-receiving element for use according to thermal dye sublimation transfer usually comprises a support, e.g. paper or a transparent film, coated with a dye-image receiving layer, into which the dye can diffuse more readily.

An adhesive layer is usually provided between the support and the receiving layer, such as those mentioned in e.g. U.S. Pat. No. 4,748,150, U.S. Pat. No. 4,965,241, U.S. Pat. No. 4,965,239 and U.S. Pat. No. 4,965,238. The vinylidene chloride copolymers described in U.S. Pat. No. 4,748,150, however, are not thermally stable, contain chloride, and are difficult to remove from the support in a recycling process. Subbing layers, such as those mentioned in U.S. Pat. No. 4,965,241, U.S. Pat. No. 4,965,239 and U.S. Pat. No. 4965238, have to be coated from organic solvents and are also difficult to remove in the recycling process.

SUMMARY OF THE INVENTION

It is an object of the present invention to provide subbing layers for the dye-receiving elements not having the disadvantages mentioned above.

It is a further object of the present invention to provide dye-receiving elements which are easily recyclable in a conventional recycling process.

It is a further object of the present invention to provide dye-receiving element having both high transfer efficiency and excellent adhesion characteristics to the support.

According to the present invention, a dye-receiving element for use according to thermal dye sublimation transfer is provided, said dye-receiving element comprising a support having on one side a dye-receiving layer and, optionally, on the other side a backcoat layer, said support carrying on at least one side a subbing layer comprising a copolyester formed by polycondensation of at least one aromatic dicarboxylic acid and at least one aliphatic diol, wherein said copolyester further comprises at least one comonomer having at least one sulfonate group in the acid and/or alkali metal salt form.

Subbing layers according to the present invention provide excellent adhesion between the support and the dye-receiving layer and/or between the support and the backcoat layer of a dye-receiving element. Further said subbing layers can be coated from aqueous solutions and can easily be removed from the support in conventional recycling processes.

DETAILED DESCRIPTION OF THE INVENTION

Examples of comonomers having at least one sulfonate group are sulfoisophthalic acid and sulfoisophthalic acid sodium salt. Sulfo isophthalic acid sodium salt is especially preferred in this invention.

Examples of dicarboxylic acids used for the preparation of the copolyester of the present invention are terephthalic acid, isophthalic acid and naphthalene dicarboxylic acid. A mixture of terephthalic acid and isophthalic acid is highly preferred.

Examples of aliphatic diols used for the preparation of the copolyester of the present invention are ethylene glycol, propylene glycol, butane diol, neopentyl glycol, 1,4-cyclohexane diol, 1,6-hexane diol and diethylene glycol. The use of ethylene glycol is highly preferred.

The copolyester of the present invention can contain a multifunctional comohomer.

Examples of multifunctional alcohols are triols such as glycerol and trimethylol propane and compounds containing four hydroxy groups such as pentaerithrytol.

Examples of multifunctional carboxylic acids are trimellitic acid, trimellitic anhydride, pyromellitic acid and aromatic polycarboxylic acid compounds corresponding to the following general formula:

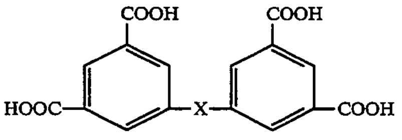

wherein X represents a chemical bond or a bivalent atom ambivalent group of atoms including oxygen, alkylene, carbonyl, sulfonyl, —$NHSO_2$—, —NHCONH—or a —NH—Q—Y—Q—NH—group wherein Q represents carbonyl or sulfonyl and Y represents a bivalent organic group.

Multifunctional hydroxyacids, the acid group(s) of which is (are) a carboxylic acid group(s), can also be used. Examples of such hydroxyacids are e.g. citric acid and tartaric acid.

The copolyester may further contain units derived from aliphatic difunctional comohomers having both hydroxy and carboxy groups e.g. glycolic acid and/or units derived from aliphatic dicarboxylic acids e.g. adipic acid.

Copolyesters of terephthalic acid, isophthalic acid, ethylene glycol and sulfo isophthalic acid sodium salt and copolyesters of terephthalic acid, isophthalic acid, ethylene glycol, trimellitic acid and sulfo isophthalic acid sodium salt are highly preferred.

Preferably, the copolyester of the present invention comprises 1 to 15 mol % of the comohomer having sulfonate groups. More preferably, the copolyester comprises 1.5 to 10 mol % of the comohomer having sulfonate groups.

The copolyester of the present invention can be prepared by conventional techniques known for polyester synthesis. Melt polycondensation is highly preferred.

Although the copolyesters of the present invention are soluble in organic solvents, water as coating liquid is highly preferred. Coating from aqueous dispersions of said copolyesters is preferred.

The subbing layer can further comprise other polymers, particles, or low molecular weight additives. Addition of inorganic particles such as silica, colloidal silica, water soluble polymers such as gelatin, polymeric latices, polystyrene sulfonic acid and polystyrene sulfonic acid sodium salt, surfactants such as cationic, artionic, amphoteric and non-ionic surfactants, and polymepic dispersants is preferred.

Especially preferred additives are colloidal silica, the above mentioned surfactants, butadiene containing latices such as poly(butadiene-co-methylmethacrylate-co-itaconic acid), polystyrene sulfonic acid and polystyrene sulfonic acid sodium salt. The addition of silica to the subbing layer decreases sticking on the coating roll after coating of the subbing layer. The addition of polystyrene sulfonic acid or polystyrene sulfonic acid sodium salt to the subbing layer accelerates the recycling process.

The subbing layer of the present invention is applied directly to the support of the dye-receiving element. The subbing layer can be applied by coextrusion or can be coated on the support. Coating from aqueous solution is preferred due to its simplicity and the possibility of adding other ingredients.

The support for the receiver sheet may be a transparent film of e.g. polyethylene terephthalate, a polyethep sulfone, a polyimide, a cellulose ester, or a polyvinyl alcohol-co-acetal. The support may also be a reflective one such as baryl-coated paper, polyethylene-coated paper, or white polyester i.e. white-pigmented polyester. Blue-coloured polyethylene terephthalate film can also be used as a support.

Although the subbing layer is useful for application on polyethylene-coated paper, substrates based on polyester, transparent or reflective, are preferred. In this case, the subbing layer can be applied before, during or after the biaxial stretching procedure.

When applied at the frontside, of the dye-receiving element, the subbing layer of the present invention improves the adhesion of the dye-receiving layer to the support.

The dye-receiving layer may comprise e.g. a polycarbonate, a polyurethane, a polyester, a polyamide, polyvinyl chloride, poly(styrene-co-acrylonitrile), and polycaprolacton or mixtures thereof. Suitable dye-receiving layers have been described in e.g. EP 133011, EP 133012, EP 144247, EP 227094, EP 228066. The dye-receiving layer may also comprise a cured binder such as the heat-cured product of poly(vinyl chloride-covinyl acetate-co-vinyl alcohol) and polyisocyanate. The use of a polyvinylchloride copolymer is highly preferred.

In order to improve the light resistance and other stabilities of recorded images, UV absorbers, singlet oxygen quenchers such as HALS-compounds (Hindered Amine Light Stabilizers) and/or antioxidants can be incorporated into the dye-image-receiving layer.

The dye-receiving layer of the receiver sheet may also contain a releasing agent that aids in separating the dye-donor element from the receiver sheet after transfer. The releasing agents can also be provided in a separate layer on at least part of the dye layer or of the dye-receiving layer. Solid waxes, fluorine- or phosphate-containing surfactants and silicone oils can be used as releasing agent. Suitable releasing agents have been described in e.g. EP 133012, JP 85/19138, and EP 227092.

The dye-receiving layer is usually hydrophobic in order to enhance the absorption of dyes into the receiving element. The polyester recycling procedure, however, uses a cleaning step whereby the film waste is immersed in an alkaline or acid soap solution in water. It is an object of this cleaning process to remove all layers casted on the polymeric substrate.

In order to remove the hydrophobic dye-receiving layer, it is highly preferred to cast an intermediate layer of an hydrophilic polymer between the subbing layer and the dye-receiving layer. This intermediate layer accelerates the cleaning step in the recycling procedure. Typical examples of hydrophilic polymers which can be used in such intermediate layers are polyvinyl alcohol, polyacrylamide, hydroxyethylcellulose, gelatin, polystyrene sulfonic acid, polyethylene glycol, poly(-meth)acrylic acid, poly(meth)acrylic acid, alkali metal salts of polyacrylic acid, crosslinked copolymers containing (meth)acrylic acid or alkali metal salts of (meth-)acrylic acid, alkali metal salts of polystyrene sulfonic acid, dextran, carrageenan and the like. Alkali metal salts of polystyrene sulfonic acid such as the sodium salt of polystyrene sulfonic acid is highly preferred, since the use of this polymer in the intermediate layer results in better anti-static properties of the dye-receiving element. Anti-static coatings such as those described in EP 440957 can be incorporated in the intermediate layer. This results both in a higher hydrophilicity and in better anti-static properties.

The intermediate layer may further comprise polymeric dispersions or latices, surfactants, inorganic particles such as silica and colloidal silica and the like. Addition of surfactants, colloidal silica and/or latices is preferred. Addition of silica to the intermediate layer decreases sticking to the coating roll after coating. Addition of latices to the intermediate layer improves the adhesion and improves the removing step in the recycling process in case sol acrylic acid or methacrylic acid type latices.

The copolyesters of the present invention can also be incorporated in the intermediate layer.

When applied to the opposite side of the dye-receiving element, the subbing layer comprising the copolyester of the present invention improves the adhesion between the support and the backcoat layer of the dye-receiving element. This backcoat layer can be hydrophilic or hydrophobic. The use of hydrophilic backcoat layers is preferred, since they hinder diffusion of dye of the dye-receiving layer of one receiving element to the backside of another receiving element, when a number of receiving elements are stored in stacked form.

Examples of hydrophilic backcoat layers are layers comprising polyvinylalcohol, polyethylene glycol, polyacrylamide, hydroxyethylcellulose, dextran and gelatin. The use of gelatin is highly preferred.

These hydrophilic backcoat layers may further comprise dispersions or latices of hydrophobic polymers, inorganic particles, surfactant and the like. The addition of these particles can be used in order to obtain a specific surface gloss, such as mentioned in European patent application no. 91203008.7. Especially preferred particles are silica and polymethylmethacrylate beads of 0.5 to 10 μm. Antistatic treatment can also be provided to said backcoat layer.

Examples of hydrophobic backcoat layers are backcoat layers comprising addition polymers such as polymethylmethacrylate, polyvinylchloride and polycondensates such as polyesters, polycarbonates in combination with the above mentioned particles for the hydrophilic backcoat layers.

With hydrophobic backcoat layers, it can be useful to provide an intermediate hydrophilic layer between the subbing layer and the backcoat layer, such as those mentioned for use at the dye-receiving side of the dye-receiving element, in order to improve the removal of the backcoat layer in the recycling procedure.

Copolyester subbing layers according to the present invention can also be provided on both sides of the support.

The dye-donor element for use in combination with the dye-receiving element of the present invention comprises a support, a dye layer at one side of the support and optionally a heat-resistant layer at the opposite side of the support. Usually a subbing layer is provided at both sides of the support in order to improve the adhesion of the dye-layer and the heat-resistant layer to the support.

Any material can be used as the support for the dye-donor element provided it is dimensionally stable and capable of withstanding the temperatures involved, up to about 400° C. over a period of up to 20 msec, and is yet thin enough to transmit heat applied on one side through to the dye on the other side to effect transfer to the receiver sheet within such short periods, typically from1 to 10 msec. Such materials include polyesters such as polyethylene terephthalate, polyamides, polyacrylates, polycarbonates, cellulose esters, fluorinated polymers, polyethers, polyacetals, polyolefins, polyimides, glassine paper, and condenser paper.

7 GV2010 Preference is given to a support comprising polyethylene terephthalate. In general, the support has a thickness of 2 to 30 μm.

The support is usually provided :with a heat-resistant layer as disclosed in e.g. EP 153880, EP 194106, EP 267469, EP 314348, EP 329117, JP 60/151096. JP 60/229787, JP 60/229792. JP 60/229795. JP 62/48589, JP 62/212192, JP 62/259889, JP 01/5884, JP 01/56587, JP 02/128899, JP 58/187396. JP 63/191678, JP63/191679, JP 01/234292, JP 02/70485, and European patent application no. 91202071.6.

The use in the heat-resistant layer of at least one polycarbonate derived from a bis-(hydroxyphenyl)-cycloalkane as disclosed in the latter European patent application no. 91202071.6 is especially preferred for its high thermostability and ease of application. Preferably, said bis(hydroxyphenyl )-cycloalkane is 1,1 -bis-(4-hydroxyphenyl )-3,3,5-trimethylcyclohexane.

The heat-resistant layer of the dye-donor element may advantageously comprise a lubricant such as a surface-active agent, a liquid lubricant, a solid lubricant, or mixtures thereof. Surface-active agents may be any agents known in the art such as carboxylates, sulfonates, phosphates, aliphatic amine salts, aliphatic quaternary ammonium salts, polyoxyethylene alkyl ethers, polyethylene glycol fatty acid esters, fluoroalkyl $C_2$-$C_{20}$ aliphatic acids. Examples of liquid lubricants include silicone oils, synthetic oils, saturated hydrocarbons, and glycols. Examples of solid lubricants include various higher alcohols such as stearyl alcohol, fatty acids, fatty acid esters, talc, teflon beads, and silica particles.

Preferred lubricants are polysiloxane-polyether copolymers and glycerol morostearate used alone or in combination with one another. Other lubricants have been described in e.g. U.S. Pat. No. 4,753,921, U.S. Pat. No. 4,916,112, U.S. Pat. No. 4,717,711, U.S. Pat. No. 4,717,712, U.S. Pat. No. 4,866,026, and U.S. Pat. No. 4,829,050. The amount of lubricant used in the heat-resistant layer largely depends on the type of lubricant, but generally is within the range of from about 0.1 to 50 weight percent (wt %), preferably 0.5 to 40 wt %, in respect of the binder or binder mixture employed.

As mentioned above the lubricants can be incorporated into the heat-resistant layer. Advantageously, however, a separate top layer comprising at least one lubricant is coated on top of the heat-resistant layer. Preferably, a top layer of a polyether-polysiloxane copolymer, is coated from a non-solvent for the heat-resistant layer on the latter layer. Another preferred separate top layer comprising lubricants has been described in European patent application no. 92200229.0.

The heat-resistant layer of the dye-donor element may contain other additives provided such additives do not impair the anti-sticking properties of the heat-resistant layer and provided that such materials do not scratch, erode, contaminate, or otherwise damage the thermal printing head or harm the image quality. Examples of suitable additives have been described in EP 389153.

The heat-resistant layer of the dye-donor element is formed preferably by adding the polymeric thermoplastic binder or binder mixture, the lubricant(s), and other optional components to a suitable solvent or solvent mixture, dissolving or dispersing the ingredients to form a coating composition, applying the coating composition to a support, which may first have been provided with a subbing layer, and dried.

The heat-resistant layer of the dye-donor element may be coated on the support or printed thereon by a printing technique such as a gravure process.

The heat-resistant layer thus formed has a thickness of about 0.1 to 3 μm, preferably 0.3 to 1.5 μm.

Subbing layers for the heat- resistant layer have been disclosed in e.g. EP 138483, EP 227090, EP 407220, EP 433496, U.S. Pat. No. 4,572,860, U.S. Pat. No. 4,717,711, U.S. Pat. No. 4,559,273, U.S. Pat. No. 4,695,288, U.S. Pat. No. 4,727,057, U.S. 4,737,486, U.S. 4,965,239, U.S. 4,753,921, U.S. Pat. No. 4,895,830, U.S. Pat. No. 4,929,592, U.S. Pat. No. 4,74,8150, U.S. Pat 4,965,238, U.S. 4,965,241. Subbing layers such as those mentioned in European Patent Application No. 922009071 are preferred.

The dye layer comprises a dye or a dye mixture and a binder or a binder mixture.

Any dye can be used in the dye layer of the dye-donor element provided it is transferable to the dye-image-receiving layer by the action of heat. Examples of suitable dyes have been described in e.g. EP 432829, EP 400706, EP 485665, EP 453020 and European patent application no. 91200218.5, and in the references cited in the above documents.

The ratio of dye or dye mixture to the binder ranges from 9:1 to 1:3 by weight, preferably from 3:1 to 1:2 by weight.

At least one of the following polymers can be chosen for use as a binder for the dye layer: cellulose derivatives e.g. ethyl cellulose, hydroxyethyl cellulose, ethyl hydroxyethyl cellulose, hydroxypropyl cellulose, methyl cellulose, cellulose nitrate, cellulose acetate formate, cellulose acetate hydrogen phthalate, cellulose acetate, cellulose acetate propionate, cellulose acetate butyrate, cellulose acetate pentanoate, cellulose acetate benzoate, and cellulose triacetate; vinyl-type resins and derivates e.g. polyvinyl alcohol, polyvinyl acetate, polyvinyl butyral, poly(vinylbutyral-co-vinylacetal-co-vinylalcohol), polyvinyl pyrrolidone, polyvinyl acetoacetal, and polyacrylamide; polymers and copolymers derived from acrylates and acrylate derivatives e.g. polyacrylic acid, polymethyl methacrylate, and styrene-acrylate copolymers; polyester resins; polycarbonates; poly(styrene-co-acrylonitrile); polysulfones; polyphenylene oxide; organosilicones e.g. polysiloxanes; epoxy resins; natural resins e.g. gum arabic; and alkyl resins. Preferably, the dye layer of the present invention comprises a poly(styrene-co-acrylonitrile).

The dye layer may also contain other additives such as e.g. thermal solvents, stabilizers, curing agents, preservatives, organic or inorganic fine particles, dispersing agents, antistatic agents, defoaming agents, and viscosity-controlling agents, these and other ingredients being described more fully in EP 133012, EP 111004 and EP 279467.

Especially preferred organic fine particles for use in the dye layer are polyethylene, polypropylene, or amide wax particles.

A dye-barrier layer comprising a hydrophilic polymer may also be provided in the dye-donor element between the support and the dye layer to prevent wrong-way transfer of dye towards the support and thus enhance the dye transfer density values. The dye barrier layer may contain any hydrophilic material that is useful for the intended purpose. In general, good results have been obtained with e.g. gelatin, polyacrylamide, olyisopropyl acrylamide, butyl methacrylate-grafted gelatin, ethyl methacrylate-grafted gelatin, ethyl acrylate-grafted gelatin, cellulose monoacetate, methyl cellulose, polyvinyl alcohol, polyethylene imine, polyacrylic acid, a mixture of polyvinyl alcohol and polyvinyl acetate, a mixture of polyvinyl alcohol and polyacrylic acid, and a mixture of cellulose monoacetate and polyacrylic acid. Suitable dye barrier layers have been described in e.g. EP227091 and EP 228065.

Between the dye layer and the support, or between the dye-barrier layer and the support, an adhesive or subbing layer can be coated such as those described in e.g. EP 433496, EP 311841, EP 268179, U.S. Pat. No. 4,727,057 and U.S. Pat. No. 4,695,288. Subbing layers such as those described in European Patent Application No. 922009071 are especially preferred.

The thermal dye sublimation transfer printing process comprises placing the dye layer of the donor element in face-to-face relation with the dye-image-receiving layer of the receiver sheet and image-wise heating from the back of the dye-donor element. The transfer of the dye is accomplished by heating for several milliseconds at about 400° C.

When the process is performed for but one single colour, a monochrome dye transfer image is obtained. A multi colour image can be obtained by using a dye-donor element containing three or more primary colour dyes and sequentially performing the process steps described above for each colour. The above sandwich of dye-donor element and receiver sheet is formed on three occasions during the time when heat is applied by the thermal printing head. After the first dye has been transferred, the elements are peeled apart. A second dye-donor element (or another area of the dye-donor element with a different dye area) is then brought in register with the receiving sheet and the process is repeated. The third colour and optionally further colours are obtained in the same manner.

In addition to thermal printing heads, laser light, infrared flash, or heated pens can be used as the heat source for supplying heat energy. Thermal printing heads that can be used to transfer dye from the dye-donor elements to a receiver sheet are commercially available. In case laser light is used, the dye layer or another layer of the dye donor-element should contain a compound e.g. carbon black that absorbs the light emitted by the laser and converts it into heat.

Alternatively, the support of the dye-donor element may be an electrically resistive ribbon consisting of e.g. a multilayer structure of a carbon-loaded polycarbonate coated with a thin aluminium film. Current is injected into the resistive ribbon by electrically addressing a print head electrode resulting in highly localized heating of the ribbon beneath the relevant electrode, The fact that in this case the heat is generated directly in the resistive ribbon and that it is thus the ribbon that gets hot leads to an inherent advantage in printing speed using the resistive ribbon/electrode head technology as compared to the thermal head technology, in which latter case the various elements of the thermal printing head get hot and must cool down before the head can move to the next printing position.

The following examples illustrate the invention in more detail without, however, limiting the scope thereof.

EXAMPLE 1

Preparation of copolyester 1

A reaction mixture of 1027.2 g of dimethyl terephthalate (5.295 moles), 775 g of dimethyl isophthalate (3.995 moles), 207.2 g of 5-sulfoisophthalic acid dimethyl ester sodium salt (0.7 mole), polycarboxylic acid methyl ester compound (CA) (0.01 mole), 1240 g of ethylene glycol (20 moles), 220 mg of zinc acetate dihydrate, and 292 mg of antimony(III)oxide was heated to 160° C. whilst stirring in a nitrogen atmosphere.

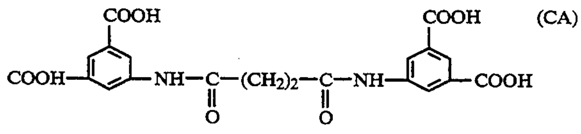

(CA)

At that temperature re-esterification started and methanol was distilled. Gradually the temperature was raised to 250° C. over a period of 3 to 4 h, until no methanol distilled anymore. Thereupon the temperature was further raised to 255° C. and the reaction mixture subjected to a reduced pressure of 0.1–0.2 mm Hg. Under these conditions the polycondensation took place within a period of about 60 to 100 min. After cooling the solidified copolyester was milled and obtained in powder form. Depending on the time of polycondensation the intrinsic viscosity of the copolyester was from 0.20 to 0.30 dl/g measured at a temperature of 25° C. in a mixture of phenol and α-dichlorobenzene (60/40 by volume). The Tg value of said copolyester is in the range of 67° to 72° C.

The preparation of an aqueous copolyester (A) dispersion was carried out by vigorously stirring the copolyester powder in hot (90°–98° C.) water. Operating that way a copolyester dispersion with average particle size smaller than 50 nm and up to 30 % by weight can be obtained easily for use as such in combination with the other ingredients mentioned in Examples 3 and 4.

EXAMPLE 2

Preparation of copolyester 2

A reaction mixture of 1027.2 g of dimethyl terephthalate (5.3 mole), 775 g of dimethyl isophthalate (4 mole), 207.2 g of 5-sulfoisophthalic acid dimethyl ester sodium salt (0.7 mole), 1240 g of ethylene glycol (20 moles), 220 mg of zinc acetate dihydrate, 292 mg of antimony(III)oxide, and 820 mg of sodium acetate was treated as in Example 1. The dispersion was made in the same way as in Example 1.

EXAMPLE 3

Subbing layers for the dye-image receiving layer

A 175 μm thick polyethylene terephthalate film was coated from water with a subbing layer. On top of this subbing layer, an intermediate layer was coated from water and a dye-receiving layer was coated from methylethyl ketone. The dye-receiving layer contains 3.6 $g/m^2$poly(vinylchloride-co-vinylacetate-co-vinylalcohol) (Vinylite VAGD supplied by Union Carbide), 0.336 $g/m^2$ diisocyanate (Desmodur VL supplied by Bayer AG) and 0.2 $g/m^2$ hydroxy modified polydimethylsiloxane (Tegomer HSI 2111 supplied by Goldschmidt).

The composition of the subbing layers and the intermediate layers is given in table I in $g/m^2$.

A dye-donor element for use according to thermal dye sublimation transfer was prepared as follows.

A solution comprising 8 wt % of dye A, 2.4 wt % of dye B, 6.4 wt % of dye and 8 wt % of poly(styrene-co-acrylonitrile) as binder in methyl ethyl ketone as solvent was prepared.

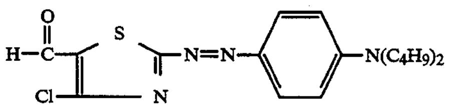

dye A

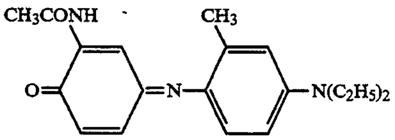

dye B

-continued

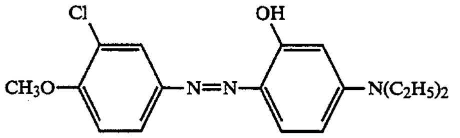

dye C

From this solution a dye layer having a wet thickness of 10 μm was coated on a 6 μm thick polyethylene terephthalate film support provided with a conventional subbing layer. The resulting dye layer was dried by evaporation of the solvent.

The opposite side of the film support was coated with a subbing layer of a copolyester comprising ethylene glycol, adipic acid, neopentyl glycol, terephthalic acid, isophthalic acid and glycerol. On top of this subbing layer, a heat-resistant layer was cased from methylethylketone, containing 0.5 $g/m^2$ of a polycarbonate having the following structure:

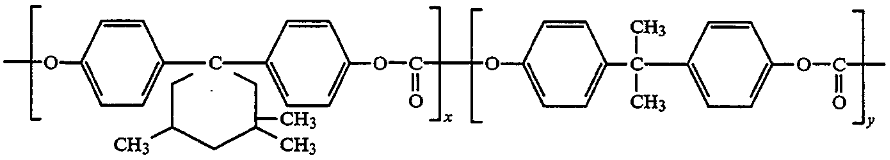

wherein x=55 mol % and y=45 mol %.

On top of said polycarbonate, a topcoat layer of polyether modified polydimethylsiloxane (Tegoglide410, Goldschmidt) was applied from isopropanol .

The dye-donor element was printed in combination with the receiving sheet in a Mitsubishi colour video printer CP100E.

The front-side of the dye-receiving element was subjected to a tape adhesion test. A small piece of transparent tape was firmly pressed by hand on part of the dye-receiving layer. The tape was torn off manually. It was then evaluated visually whether the dye-receiving layer was removed together with the tape. Ideally nothing of this dye-receiving layer was to be removed.

The following categories were established:poor adhesion (P) , moderate (M), good (G) and excellent (E).

This tape test was repeated for each of the dye-receiving elements identified in Table 1.

The recycling procedure was evaluated by immersing strips of 10 mm by 10 mm of the dye-image receiving element in aqueous NaOH solution (12.5 wt %) at 95° C. The time necessary to remove the dye-receiving layer, the subbing layer and the intermediate layer was measured.

The following categories Were established:

Poor (P):no removal after I hour

Moderate (M):removal after 1 hour

Good (G):removal after 30 minutes

Excellent (E):removal after 15 minutes.

In table I the following abbreviations were used:

CP1:Copolyester described in example 1

CP2:Copolyester described in example 2

CP3:Copolyester described in example 1 but with 10 mol % sulfo isophthalic acid (sodium salt)

AD1:Kieselsol 100 (Bayer AG)

AD2:Kieselsol 300 (Bayer AG)

POL1: Gelatin

POL2 :Polystyrene sulfonic acid sodium salt

POL3 :Polystyrene sulfonic acid :

POL4 :Copolymer latex containing 50 wt % ethylacrylate, 33.5 wt % methylmethacrylate and 16.5 wt % methacrylic acid.

TABLE 1

| Test N° | Subbing layer | Intermediate layer | Tape-test | Recycling |
|---|---|---|---|---|
| COMP | — | — | M | P |
| 1 | 1.5 $g/m^2$ CP3 | — | G | M |
| 2 | 0.5 $g/m^2$ CP2 | — | E | M |
| 3 | 0.4 $g/m^2$ CP2 + 0.1 $g/m^2$ AD1 | — | E | M |
| 4 | 0.4 $g/m^2$ CP1 + 0.1 $g/m^2$ AD1 | 0.15 $g/m^2$ POL1 + 0.35 $g/m^2$ AD2 | E | E |
| 5 | 0.39 $g/m^2$ CP1 + 0.01 $g/m^2$ POL2 + 0.1 $g/m^2$ AD1 | 0.25 $g/m^2$ POL1 + 0.25 $g/m^2$ AD2 | E | E |
| 6 | 0.39 $g/m^2$ CP1 + 0.01 $g/m^2$ POL3 + 0.1 $g/m^2$ AD1 | 0.25 $g/m^2$ POL1 + 0.25 $g/m^2$ AD2 | E | E |
| 7 | 0.488 $g/m^2$ CP1 + 0.012 $g/m^2$ POL2 | 0.25 $g/m^2$ POL1 + 0.25 $g/m^2$ AD2 | E | E |
| 8 | 0.450 $g/m^2$ CP1 + 0.05 $g/m^2$ POL2 | 0.25 $g/m^2$ POL1 + 0.25 $g/m^2$ AD2 | E | E |
| 9 | 0.25 $g/m^2$ CP1 + 0.15 $g/m^2$ POL4 + 0.1 $g/m^2$ AD1 | 0.25 $g/m^2$ POL1 + 0.25 $g/m^2$ AD2 | E | E |
| 10 | 0.4 $g/m^2$ CP1 + 0.1 $g/m^2$ AD1 | 0.25 $g/m^2$ POL2 + 0.25 $g/m^2$ AD2 | G | E |

It can be seen from the examples in table 1 that the subbing layer of tile present invention improves the adhesion between the dye-receiving layer and the support (tests 1 to 3). Addition of hydrophilic polymers to the subbing layer and/or application of an intermediate layer improves the recycling procedure without affecting the adhesion (tests 4 to 10).

EXAMPLE 4:

Subbing layers for the backcoat layer

A 175 μm thick polyethylene terephthalate film was coated from water with a subbing layer, an intermediate layer and a dye-receiving layer such as indicated in test 8 of example 3.

The opposite side of the dye-receiving element was coated from water with a subbing layer comprising 0.4 $g/m^2$ of copolyester 2 and 0.1 $g/m^2$Kieselsol 100. On top of this subbing layer, a backcoat layer was applied containing 0.25 $g/m^2$ gelatin and 0.25 $g/m^2$ Kieselsol 300.

Tape-tests on both side of the dye-receiving element demonstrated an excellent adhesion of the dye-receiving layer and the backcoat layer.

The dye-receiving element was immersed in aqueous NaOH (12.5 wt %) at 95° C. After 10 minutes, the dye-receiving layer, the intermediate layer, the subbing layers on both side of the support and the backcoat layer were removed.

We claim:

1. Dye-receiving element for thermal dye sublimation transfer comprising a support having on one side in the order given an adhesive subbing layer, a dye barrier intermediate layer containing a hydrophilic binder different from the subbing polymer and a dye-receiving layer comprising a hydrophobic polymer and, optionally on the other side a backcoat layer, wherein said subbing layer comprises a copolyester formed by polycondensation of at least one aromatic dicarboxylic acid and at least one aliphatic diol, said copolyester further comprising at least one comonomer having at least one sulfonate group in the acid form, alkalimetal salt form, or mixtures thereof.

2. Dye-receiving element according to claim 1, wherein said comonomer having at least one sulfonate group is sulfo isophthalic acid or sulfo isophthalic acid sodium salt.

3. Dye-receiving element according to claim 1, wherein said comohomer having at least one sulfonate group is present in an amount of from 1.5 to mole %.

4. Dye-receiving element according to claim 2, wherein said copolyester contains isophthalic acid, terephthalic acid, ethylene glycol and sulfo isophthalic acid or sulfo isophthalic acid sodium salt.

5. Dye-receiving element according to claim 1, wherein said subbing layer further comprises colloidal silica, polystyrene sulfonic acid, polystyrene sulfonic acid sodium salt, or mixtures thereof.

6. Dye-receiving element according to claim 1, wherein said support is a polyester, 7. Dye-receiving element according to claim 1, wherein said dye-receiving layer comprises a polyvinylchloride copolymer.

8. Dye-receiving element according to claim 1, wherein said hydrophilic binder is selected from the group consisting of gelatin, polystyrene sulfonic acid, polystyrene sulfonic acid sodium salt, polyvinylalcohol, and water soluble cellulosic binders.

9. Dye-receiving element according to claim 1, wherein a subbing layer is applied between the support and the backcoat layer.

10. Dye-receiving layer according to claim 9, wherein said backcoat layer is hydrophilic.

11. Dye-receiving element according to claim 10, wherein said backcoat layer comprises gelatin.

12. Dye-receiving element according to claim 9,wherein said backcoat layer further comprises matting agents, antistaticagents, or mixtures thereof.

* * * * *

UNITED STATES PATENT AND TRADEMARK OFFICE

CERTIFICATE OF CORRECTION

PATENT NO. : 5,376,149

DATED : December 27, 1994

INVENTOR(S) : Geert Defieuw et al

It is certified that error appears in the above-indentified patent and that said Letters Patent is hereby corrected as shown below:

On the title page:

[75] Inventors: "Antwerp" should read -- Antwerpen --;

[57] Abstract, line eight, "comohomer" should read -- comonomer --;

Column 1, line 20, "heat-generating resisters" should read -- heat-generating resistors --;

Column 2, lines 21/22, "sulfoisophthalic" should read -- sulfo isophthalic --;

Column 2, line 62, "difunctional comohomers" should read -- difunctional comonomers --;

Column 3, lines 4 and 6, "comohomer" should read -- comonomer --;

Column 3, line 21, "artionic" should read -- anionic --;

Column 3, lines 40/41, "a polyethep sulfone" should read -- a polyether sulfone --;

Column 3, line 43, "baryl-coated paper" should read -- baryta-coated paper --;

Column 3, line 52, "frontside, of" should read -- frontside of --;

Column 5, line 40, "froml to 10" should read--from 1 to 10--;

Column 5, line 45, "7 GV2010" should be deleted;

UNITED STATES PATENT AND TRADEMARK OFFICE

CERTIFICATE OF CORRECTION

PATENT NO. : 5,376,149

DATED : December 27, 1994

INVENTOR(S) : Geert Defieuw et al

It is certified that error appears in the above-indentified patent and that said Letters Patent is hereby corrected as shown below:

Column 5, line 51, "JP 60/229792. JP 60/229795." should read -- JP 60/229792, JP 60/229795, --;

Column 5, line 61, "bis(hydroxyphenyl )" should read -- bis(hydroxyphenyl)-- and "1,1 -bis-(4-" should read -- 1,1-bis-(4- --;

Column 7, line 22, "and alkyl" should read -- and alkyd --;

Column 7, line 43, "olyisopropyl acrylamide" should read -- polyisopropyl acrylamide --;

Column 9, line 3, "a-dichlorobenzene" should read -- o-dichlorobenzene --;

Column 9, lines 41/42, "methylethyl ketone" should read -- methylethylketone --;

Column 9, line 43, "$g/m^2$poly" should read -- $g/m^2$ poly --;

Column 9, line 47, "(Tegomer HSI 2111" should read -- (Tegomer H SI 2111 --;

Column 9, line 54, "6.4 wt. % of dye and" should read -- 6.4 wt. % of dye C and --;

Column 10, line 17, "was cased" should read -- was casted --;

Column 10, line 32, "(Tegoglide410," should read -- (Tegoglide 410, --;

UNITED STATES PATENT AND TRADEMARK OFFICE

CERTIFICATE OF CORRECTION

PATENT NO. : 5,376,149

DATED : December 27, 1994

INVENTOR(S) : Geert Defieuw et al

It is certified that error appears in the above-indentified patent and that said Letters Patent is hereby corrected as shown below:

Column 10, line 54, "Were" should read -- were --;

Column 10, line 55, "I hour" should read -- 1 hour --;

Column 10, line 68, "acid:" should read -- acid --;

Column 11, line 18, "of tile present" should read -- of the present --;

Column 11, line 50, "polymer" should read -- layer --;

Column 12, line 24, "comohomer" should read -- comonomer --;

Column 12, line 25, "1.5 to mole %" should read -- 1.5 to 10 mole % --.

Signed and Sealed this

Thirteenth Day of June, 1995

Attest:

BRUCE LEHMAN

*Attesting Officer*

*Commissioner of Patents and Trademarks*